United States Patent [19]

Hilton

[11] Patent Number: 5,090,242
[45] Date of Patent: Feb. 25, 1992

[54] REMOTE, PNEUMATIC, CONTINUOUS SENSOR OF THE LIQUID LEVEL IN A VACUUM TANK

[75] Inventor: Ralph M. Hilton, Salt Lake City, Utah

[73] Assignee: Hilton Instruments, Inc., Salt Lake City, Utah

[21] Appl. No.: 547,959

[22] Filed: Jul. 5, 1990

[51] Int. Cl.$^5$ ............................................. G01F 23/18
[52] U.S. Cl. .......................................... 73/302; 73/301
[58] Field of Search ................. 73/299, 302, 300, 301, 73/303

[56] References Cited

U.S. PATENT DOCUMENTS

| | | | |
|---|---|---|---|
| 922,284 | 5/1909 | Jones | 73/302 |
| 1,612,829 | 1/1927 | Muzzy | 73/303 |
| 3,613,456 | 10/1971 | Hopfe | 73/439 |
| 3,729,997 | 5/1973 | Luke | 73/302 |
| 3,987,675 | 10/1976 | Harrison | 73/302 |
| 4,020,690 | 5/1977 | Samuels et al. | 73/299 |
| 4,145,926 | 3/1979 | Martig, Jr. | 73/302 |
| 4,409,833 | 10/1983 | Thompson et al. | 73/302 |
| 4,422,326 | 12/1983 | Sasaki | 73/302 |
| 4,639,738 | 1/1987 | Young et al. | 73/302 |
| 4,665,746 | 5/1987 | Sheppard | 73/302 |
| 4,711,127 | 12/1987 | Hafner | 73/302 |
| 4,747,062 | 5/1988 | Esau | 364/509 |
| 4,840,056 | 6/1989 | Fernandez et al. | 73/302 |

FOREIGN PATENT DOCUMENTS

| | | | |
|---|---|---|---|
| 511199 | 9/1922 | France | 73/303 |
| 2099584 | 12/1982 | United Kingdom | 73/302 |

OTHER PUBLICATIONS

Omega Catalogue, Omega Engineering Inc, 1987, Measurement Handbook of Encyclopedia, P.O. Box 4047, Stamford, CT 06907.

Primary Examiner—William A. Cuchlinski, Jr.
Assistant Examiner—Diego F. F. Gutierrez

[57] ABSTRACT

An apparatus and method of the gas-bubbling type for determining the level of a body of liquid sewage standing in a tank which is vented to a partial vacuum; that is a tank whose internal gas pressure above the liquid is less than ambient gas pressure outside the tank. Measurements are obtained by drawing a small flow of ambient gas thru a gas jet into a bubbler tube set with its opening in the lower drain line of the tank. This allows the gas to bubble up to the surface through the liquid sewage. Gas pressure in the bubbler tube is communicated to one side of a differential pressure transducer. The other side of the transducer is connected to the partial vacuum above the liquid sewage in the tank. The differential pressure transducer, sensing the difference between these two pressures transmits an electronic, linear output, measurement signal. The accuracy of this measurement system is not affected by varying ambient or internal gas pressures as long as gas bubbles are being emitted from the bubbler tube.

2 Claims, 5 Drawing Sheets

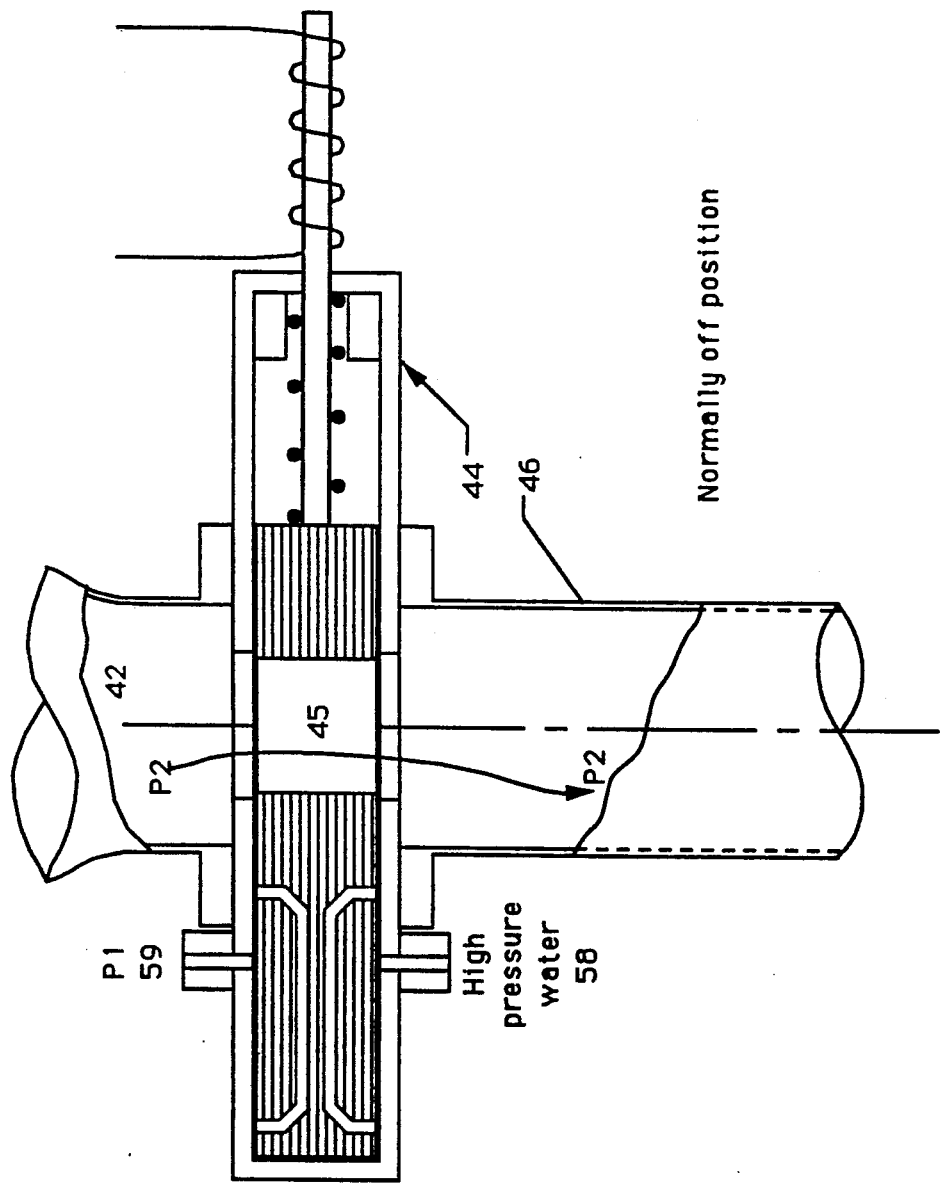

REMOTE, PNEUMATIC, CONTINUOUS SENSOR OF THE LIQUID LEVEL IN A VACUUM TANK

BACKGROUND

1. Field of Invention:

This invention relates to measuring the various liquid levels in a holding tank which is vented to a vacuum (pressures less than ambient air pressure surrounding a tank). Particularly it uses a bubbler tube open to the bottom of the holding tank and bubbles air up through the liquid in the tank. An example of this invention would be the measurement of the sewage level in the waste tank of a commercial jet aircraft.

2. Description of Prior Art:

Modern aircraft are equipped with toilets for use by the passengers and the crew. These toilets usually (2 or 3) flush into a single sewage waste tank. The waste tank is vented to the partial vacuum (low atmospheric pressure) existing at flying altitudes, or as created by a vacuum pump, if the aircraft is on the ground. When toilets are flushed into the waste tank there is a driving rush of air from the compressed cabin atmosphere as it escapes down the toilet toward the waste tank, pushing all the sewage ahead of it. As a result the sewage is violently foamed and splattered over the inside of the waste tank as it enters. This splattering is also caused in large part by the entrained gasses and air held in the waste at cabin air pressure, but becomes explosive when that pressure is released in the partial vacuum of the waste tank. In the past, all prior art which has been installed internal to the holding tank has been coated and caked with dried waste rendering them unreliable and inaccurate. Several methods of continuous sewage measurement have been tested with varying degrees of success. One of the most promising methods which is being developed is measuring the differential pressure between the top and the bottom of the holding tank. However this last measuring method is both expensive and heavy, and uses sewage operating against a sensitive pressure diaphragm as the medium of measurement. The contact with sewage against this bottom sensitive diaphragm is troublesome when subjected to turbulence, contamination, corrosion and lower sewage line freezing.

The present invention overcomes these problems of the prior art by having the sensitive pressure diaphragm external and remote from the waste tank while using clean air as the interface between the sensitive diaphragm and the sewage. Thus the present invention is free of the operating drawbacks of the prior art. The present invention is able to give reliable and accurate readouts of the liquid level in the tank and it is conveniently sized and inexpensive to produce.

For a better understanding of this invention the following symbols and definitions relate to the sign convention of air pressure as referenced in this patent application:

$P1$ = refers to aircraft passenger cabin air pressure exterior to a waste tank (see FIG. 1) This pressure, $P1$, as referred to in this application is a gauge pressure reference point. Therefore a standard pressure gauge mounted external to a tank with its pressure port disconnected would read 0 PSIG(=$P1$). This reference point will normally fluctuate and be in the range of 7.0 to 14.7 PSI absolute. Therefore negative pressures as referenced in this application are less than $P1$. The reason the $P1$ reference point changes is whether an aircraft is on the ground or flying. Cabin air pressure pumps pressurize the cabin at approximately the 8,000 foot level of altitude even though the aircraft may fly at much higher altitudes where lower pressures exist.

$P2$ = refers to the pressure inside a bubbler tube and is normally less than $P1$. This negative air pressure or partial vacuum is found at a point in this sensor known as a bubble source point when the sensor system is stable and operating. Due to the low air flow rate through the bubbler system and the large size of the air flow passages, $P2$ at the bubble source point is negligibly different from the $P2$ pressure acting on the differential pressure diaphragm.

$P3$ = refers to the pressure above the sewage in the waste tank and is normally less than $P2$ when the sensor is running. Thus $P3$ is a negative pressure in the top of the waste tank above the liquid and in a vent line above the waste tank. If an aircraft is operating at a flying altitude, $P3$ is maintained by the negative air pressure found out side the aircraft. But if an aircraft is on the ground, $P3$ is maintained by vacuum pumps.

$P4$ = refers to the air pressure found out side an aircraft. If the aircraft is on the ground $P4$ is the same as $P1$, but if the aircraft is flying it is that negative atmospheric pressure or partial vacuum found at that flying altitude.

When I use the term "vacuum" in this application I mean any negative air pressure which is less then $P1$.

ADVANTAGES

Following are advantages of the present invention:

(1) New Application

This invention is a new and an ideal application for the low pressure, low cost, silicon diaphragm differential pressure transducers available from several suppliers.

(2) Operates on Clean Air

Clean air flow is used as an interface between the sewage and the sensitive electronic hardware.

(3) Simple

There are no moving parts except one solenoid actuated valve. This invention consists of simple plumbing of tubes and hoses and uses a tamper-proof, solid state, differential pressure transducer and logic circuitry.

(4) Rugged and Durable

The present invention remotely senses the sewage level using the medium of clean air, and is not exposed to or contaminated by the foaming and splattering of the sewage. This system can still operate and give accurate readings even though small leaks develop in the plumbing. This sensing device is designed to have a long life cycle, as long as the aircraft's, if given reasonable maintenance. The mounting of all system components will be in compliant mounting hardware restive to mechanical shock and vibration. Measuring system is ice and freeze resistant because the interface medium of measurement is gas, and there are no sensitive mechanical parts at the measuring point.

(5) Accurate

The present invention will show readouts accurate within two percent throughout the entire operating range of temperature, pressure and other variable parameters. The readings are accurate even when solid objects are flushed into the system or floating objects such as chunks of ice are present. The present invention requires only an occasional bubble to be emitted from a bubble source point (approximately 1 to 4 bubbles per sec.) for and accurate reading. A bubble of air will find its way around or through any such obstacles and rise through the surrounding liquid to the surface. It gives accurate data on the height of liquid standing in a tank even if there is a substantial variation in P1 or P3.

(6) Cost Effective

It is estimated that the present invention could be manufactured and installed for half the cost of prior measuring systems.

(7) Light Weight

All components together of the present invention will be approximately 6 pounds per holding tank.

(8) Ease of Production and Use

The present invention is not high technology and no elaborate training of a crew is required to maintain and use it. A few simple instructions are all that is required. No new or unusual tools are required. All the components are of current technology and are readily available in the market. The components in the system, which may possibly fail, can be quickly replaced with new modules in short time.

(9) Compatibility

In the case of existing aircraft, this sensing system may be retrofitted into prior art situations without difficulty. All electric power to operate this system is available and installed.

(10) Noise, Odor and Cleanliness

The present invention works with an occasional click of a solenoid and the barely perceptible murmur of air bubbling through the liquid inside the plumbing. This means practically no detectable noise. Also, even though the device is measuring sewage there is no odor produced. The device is clean in that sewage is not the interface medium of measurement, but only clean air.

(11) Quick Response

From the time the system is switched on there is only a few seconds delay until a stable accurate output reading is available.

(12) Other

Further objects and advantages of this invention will become apparent from a consideration of the drawings and ensuing descriptions.

THE DRAWINGS

FIG. 1: Prior art flow diagram of a vacuum waste tank and its plumbing as it exists on some commercial aircraft (numbers 10 thru 36). The present invention is to be added to this prior system to measure the height (h) of sewage standing in the waste tank.

FIG. 2: Conceptual flow diagram of a remote, pneumatic, continuous liquid level sensing device, which is the subject of this invention (38 thru 56), as added to the prior sewage system (10 thru 36) of some commercial aircraft.

FIGS. 3a and 3b: Schematic, cut away views of the operation of a solenoid actuated air/water valve. These figures show what flows through this valve in a normal "off" position, and in an "on" or energized position. This valve would be energized infrequently and then only momentarily.

FIG. 4: Flow chart of a logic control module (LCM).

LIST OF PARTS

| Number | |
|---|---|
| 10 | Valve, sewage input from flush toilets |
| 12 | Entrance elbow for sewage entering waste tank 14 |
| 14 | Waste tank assembly |

-continued
LIST OF PARTS

| Number | |
|---|---|
| 15 | Zero Point in bottom of waste tank 14 for measuring height (h) 17. This point coincides with the vertical ID point of a lower drain line |
| 16 | Liquid level standing in waste tank 14 |
| 17 | Height (h) of liquid above zero point 15 |
| 18 | Separator, Air/sewage |
| 20 | Top elbow and cover of waste tank 14 |
| 22 | Vent line, upper, holding P3 vacuum |
| 24 | Valve, air, 3 way |
| 26 | Vent, final, to outside P4 atmospheric pressure |
| 28 | Vacuum pump |
| 30 | Rings on waste tank 14 for mounting to aircraft frame |
| 32 | Bottom elbow and cover of waste tank 14 |
| 34 | Drain line, lower |
| 36 | Valve for drain line |
| 38 | Filter, intake air, receiving P1 cabin air pressure |
| 40 | Jet, orifice, air flow restriction |
| 42 | Air reservoir, holding P2 vacuum |
| 44 | Valve, solenoid actuated, air/water (see detail FIG. 3) |
| 45 | Air passage for P2 air in valve 44 in "off" position |
| 46 | Bubbler tube, holding P2 vacuum |
| 48 | Tee fitting |
| 49 | Bubble source point |
| 50 | Horse, armored, flexible, rubber assembly |
| 54 | Electric output in volts to gauges, etc. |
| 56 | Logic control module (LCM) assembly (see details FIG. 4) |
| 58 | Water, high pressure, input line from aircraft supply |
| 59 | Vent, filtered, open to P1, cabin air pressure |
| 60 | Transducer, differential pressure, with amplified electric output |
| 62 | Voltage regulator |
| 64 | Electric power source, 24 Volt DC |
| 66 | Filter, electronic, low pass band type |
| 68 | Logic control board |

DETAILED DESCRIPTION and Operation of the Prior Art Sewage System to Which The Present Invention is to be Added Referring to FIG. 1: This shows general appearance and alignment of a vacuum waste tank 14 and its plumbing as they are found on some commercial aircraft. When an aircraft toilet is flushed, P1 pushes the sewage thru input valve 10 and into waste tank 14. The sewage enters tank 14 thru the entrance elbow 12. Tank 14 is constructed of carbon fiber reinforced composite material with an inner stainless steel liner and is mounted to the aircraft frame by 2 rings 30. In order for a toilet to flush, P3 must be less than P1. If an aircraft is on the ground, vacuum pump 28 must be running to provide P3. With vacuum pump 28 on, the 3-way valve 24 is automatically set to draw air from waste tank 14 and an upper vent line 22 and exhaust is thru pump 28. Any air mixed with sewage is separated by 18 before the air is drawn off by vacuum pump 28. If an aircraft is air born, tank 14 and vent line 22 are vented to low atmospheric pressure P4 existing out side the aircraft 26. When pump 28 is shut off, valve 24 opens vent line 22 to 26. The value of P4 changes during flight depending on the altitude at which the aircraft is flying. P4 will act on vent 22 and tank 14 the same manner as the vacuum pump 28 did when the aircraft was on the ground.

There is a reference point established called "zero point" 15 in FIG. 1 at the top of the inner diameter of the lower drain line 34. Sewage 16 as it accumulates in waste tank 14 is measured in inches above this zero point 15. If sewage reaches a certain point, about three fourths the height of tank 14, it is considered full. The tank 14 must be emptied into a sewage truck on the ground before a new take off. In the past, major problems have occurred when, due to the unreliability of the prior art, a waste tank overflowed into the passengers' cabin and vacuum pump 28. Also inaccurate readings in the past have required draining of tank 14 when it was only partially full.

The above description is necessary to understand how the present invention will fit on this prior sewage system (numbers 10 thru 36) and reliably measure the level of the sewage it contains.

SUMMARY DESCRIPTION OF THE PRESENT INVENTION

The objective of the present invention, in its preferred embodiment, (FIG. 2) is to provide a reliable method to continuously measure the level of sewage standing in waste tank 14 on a commercial aircraft, whether the aircraft is on the ground or flying.

Another objective is to locate the measuring mechanism outside and remote (FIG. 2) to the contaminating environment found inside a vacuum waste tank 14.

To accomplish the above objectives the present invention uses air bubble type technology, but alters it to apply to a vacuum waste tank 14. This invention consists of a bubbler tube, hoses, air filter, air jet, transducer and electronics mounted onto a prior art sewer system of a commercial aircraft. By measuring two distinctly different internal pressures, P2 and P3, which exist when the invention is in operation, it is possible to determine the liquid level in tank 14. The unique assemblage of prior art components mounted to a vacuum tank to measure sewage liquid level is the essence of the present invention. The use of this new pattern of assemblage results in attractive operational and maintenance benefits previously unutilized. The gauging of the liquid is performed by measuring the net difference between P2 and P3 pressures. These measurements are not affected by either, variable cabin pressures in a commercial aircraft, nor by variable outside atmospheric pressures experienced as an aircraft rises to flight altitude or descends back to the ground. P2 pressure is directly related to the height of a hydrostatic head of fluid 16 standing in a tank 14. P3 is the pressure existing above a fluid sewage surface 16 within a waste tank 14 which is vented to low overboard, atmospheric pressure. P3 pressure can be considered as a "partial vacuum" when an aircraft is flying.

In this invention, P2 pressure air, standing in a bubbler tube 46 whose bottom opening 49 is set in the lower drain line 34, will be drawn out in the form of bubbles. Said bubbles will rise up through the liquid medium, pop out at the surface and be drawn off by the low P3 partial vacuum.

The bubbling action will be excessive and violent if an unrestricted supply of air is allowed to enter the bubbler tube 46. Therefore in this invention, a jet 40 or choke point is installed at the intake point 38 of the bubbler tube 46. The jet 40 allows only a small amount of air to pass into the system. This results in a manageable series of bubbles being drawn out of the bottom 49 of the bubbler tube 46 to activate this invention.

Prior art differential transducers 60 and electronic components 68 are utilized to convert the difference between P2 and P3 pressures into useable electronic measurement signals 54 which are proportional to the liquid sewage level standing in the tank 14.

DESCRIPTION OF PREFERRED EMBODIMENT

Figure 1:
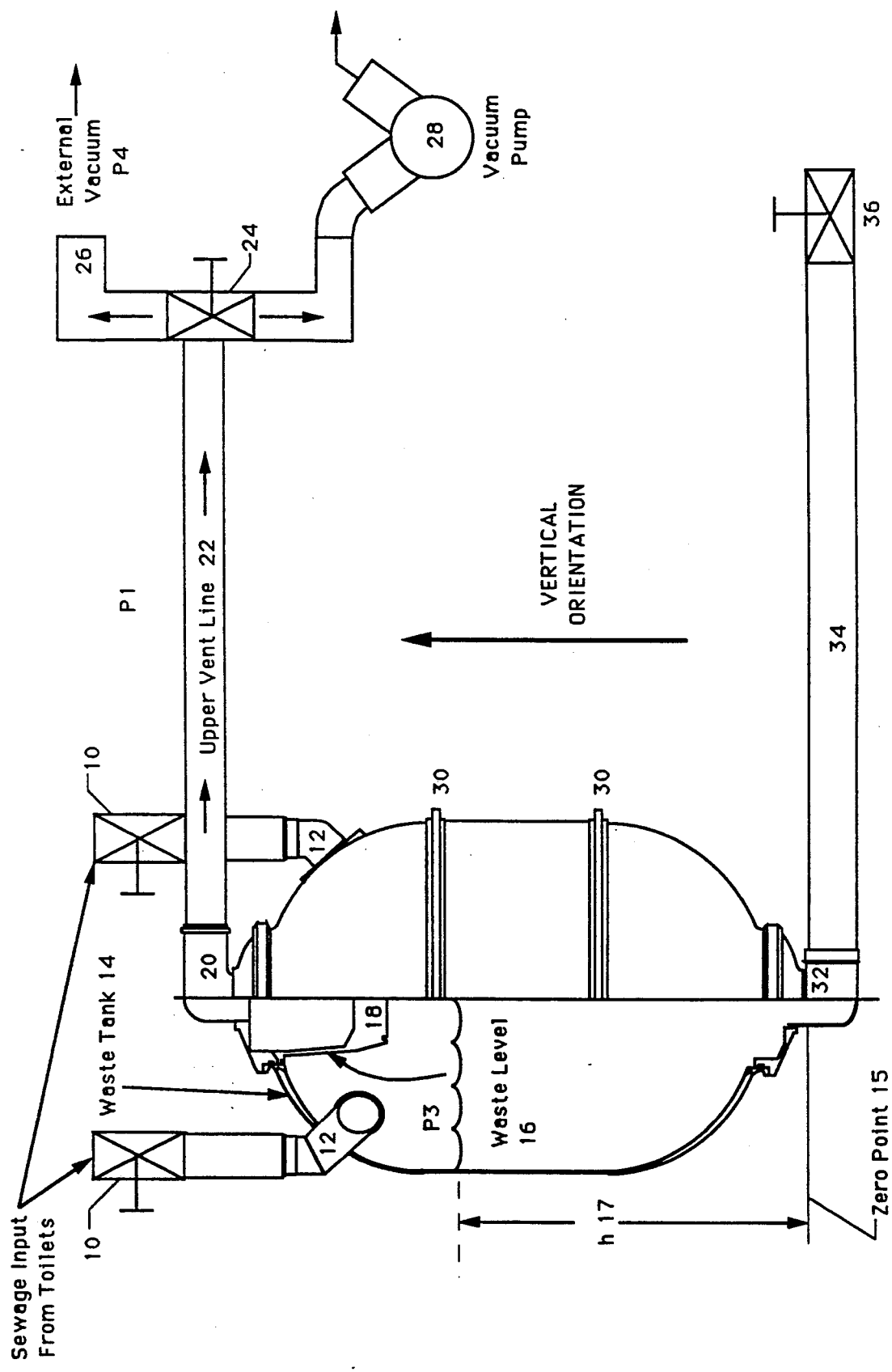
Figure 2:
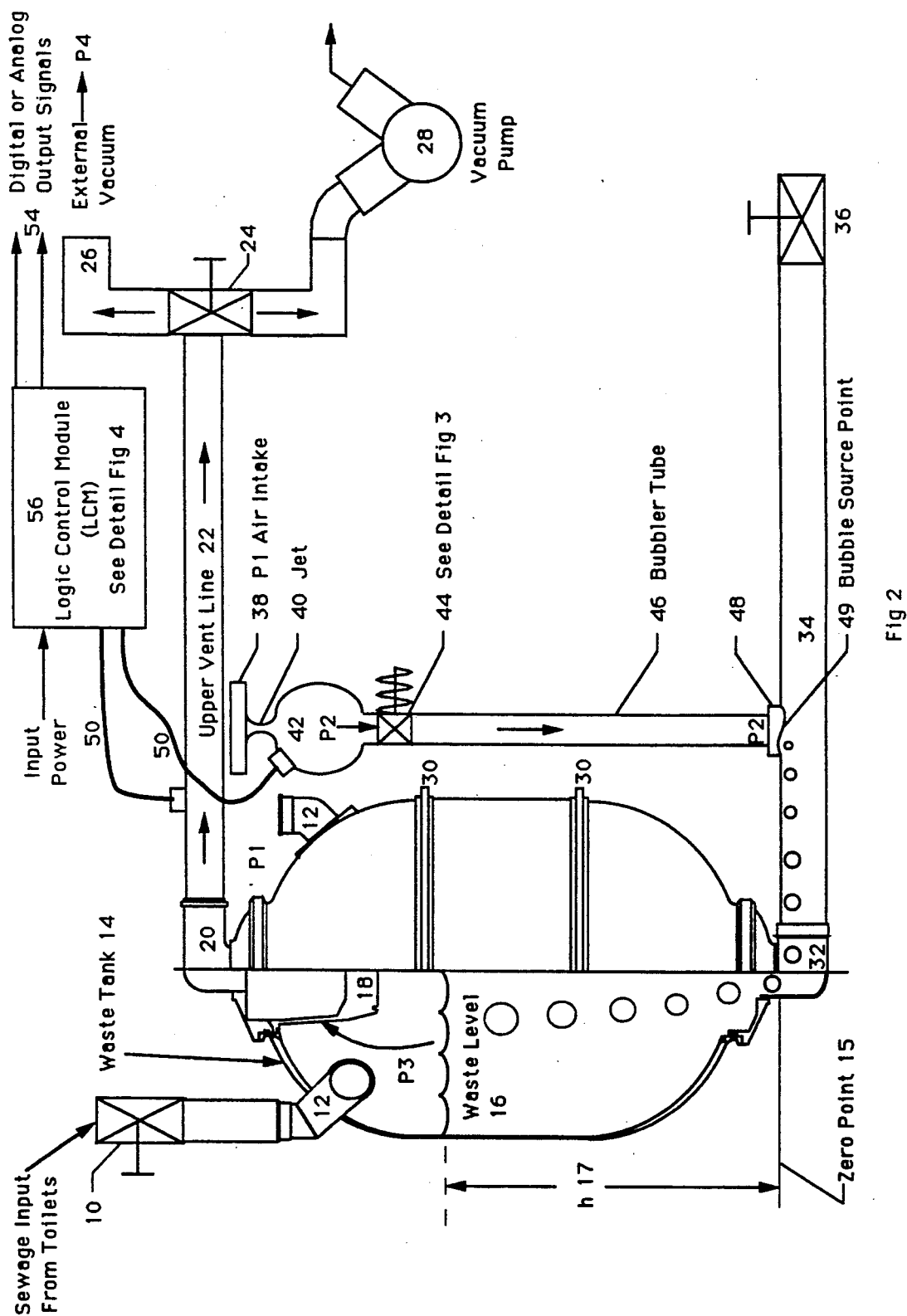

FIGS. 2, 3a, 3b, and 4 demonstrate a schematic representation of the operation of the current invention with an emphasis on the operational overviews. The manufactured parts to perform the operational functions will look quite different from the schematic representations. FIG. 2 represents the addition of the current invention to the prior sewage systems existing on many aircraft. For future manufacturing of aircraft, the current invention would be designed into the production sewage system.

This invention starts with a less than 50 micron, sintered metal air filter 38 at the head of the sensor system. It is attached to a stainless steel air jet 40. The jet 40 has an air tight connection to an air reservoir 42. The air reservoir 42 is attached to a solenoid actuated air/water valve 44. This valve 44 is controlled either by a manual button or automatically by the logic control module (LCM) 56. The solenoid valve 44 is attached to bubbler tube 46. This bubbler tube 46 is made of stainless steel, approximately 1.50 inch tube diameter with approximately an 0.032 inch wall thickness and is attached to the stainless steel tee 48 installed in the lower drain line 34.

All the joints and places of attachment are sealed and capable of holding a vacuum. The bubbler tube 46, and air reservoir are mounted by flexible supports to the waste tank rings 30 and brackets (not shown). The inner volume of the air reservoir 42 is approximately equal to the volume of bubbler tube 46. The bubble source point 49 is the large lower opening of the stainless steel tee 48. This point 49 must have smooth interior joints to avoid sewage collection points and for easy cleaning. This area must be kept open and free to allow air bubbles to pass thru lower drain 34 and bottom elbow 32 so they may rise through the sewage in the waste tank. On reaching the surface the air bubbles pop and are carried off by P3 in an upper vent system of 18,20,22,24,26, and 28.

In FIG. 2 the LCM 56 receives two negative pressure or vacuum inputs P2 and P3 and converts the information into usable electrical signals indicating the waste level in the tank. Armored, flexible, rubber hose assemblies 50, are attached, one to the P3 from the upper vent line 22, and the other to P2 in air reservoir 42. These hoses 50 communicate their respective pressures to the LCM 56.

Figure 4:
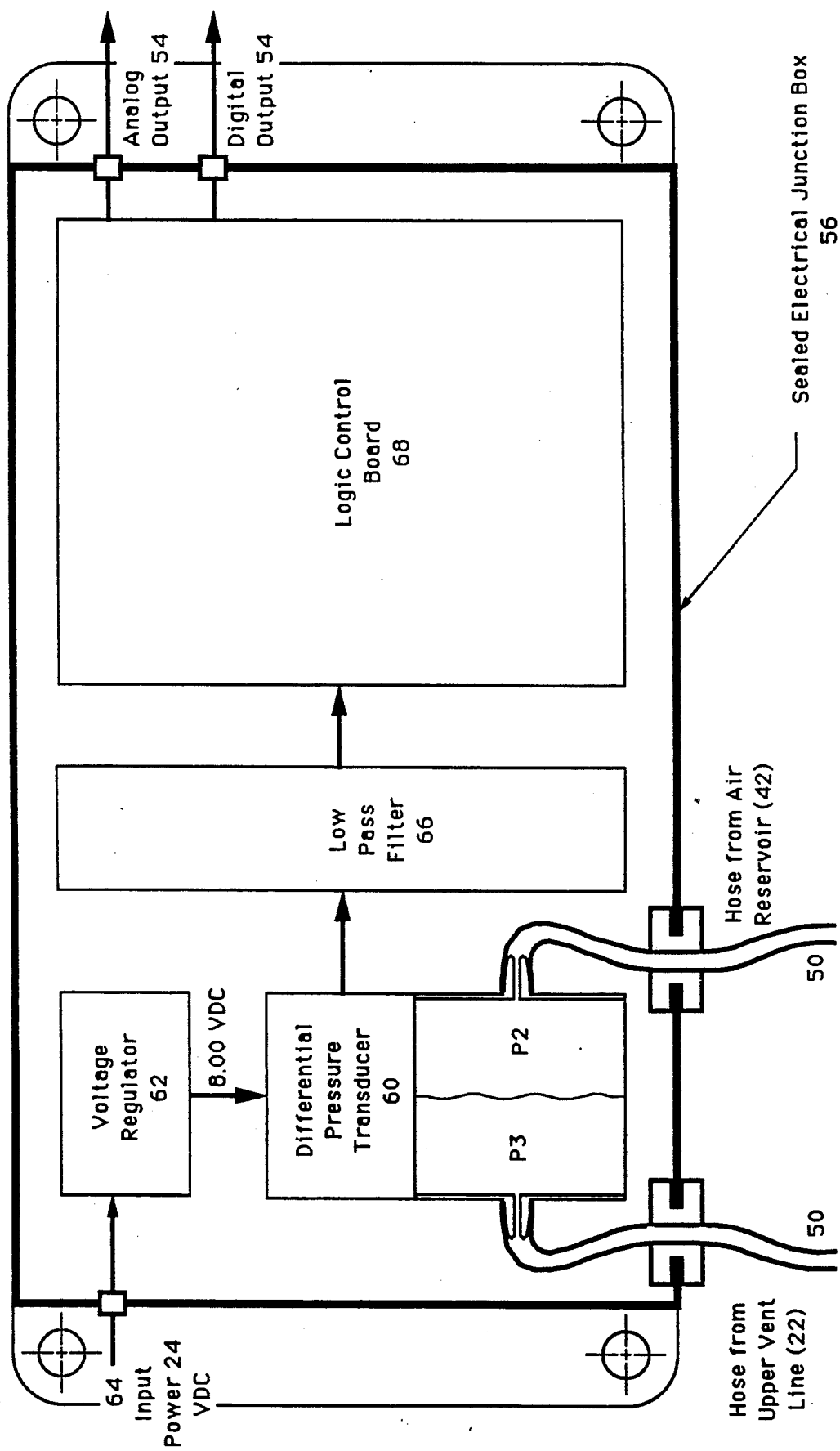

Referring now to FIG. 4, one differential pressure transducer 60 measures the pressure difference between P2 and P3. The magnitude of this difference is the following:

$$\Delta P = P2 - P3 = \rho g h$$

where:
 $\rho$ = density of the liquid
 g = local acceleration of gravity
 h = height of the liquid above the bubble source point 49.

This measurement varies proportionally with the height (h) of sewage 16 in waste tank 14. To achieve extra reliability three transducers may be designed into this system using voting logic to indicate which of the transducers may be faulty. The pressure transducer delivers an amplified voltage output. Electrical power 64 to the pressure transducer 60 is supplied by the 24 VDC aircraft power system. The transducer we used on the test model operated on 8 VDC, therefore a voltage regulator 62, is required on the supply circuit to step down the supply volts from 24 VDC to 8 VDC. The amplified output of the transducer is filtered through a low pass filter 66 which stabilizes the waste level reading. The filter tested on out test model was a simple RC filter whose 3 dB pole point was located at 0.25 Hz. A logic control board 68 analyzes and processes voltage from the transducers 60 and filter 66 to give a variety of outputs as required by the customer. Output from the LCM 56 can be analog or digital signals and can energize warning lights, gauges, relays, (not shown) and the solenoid actuated valve 44.

If the sewage system were operating in a dynamic vehicle, like an aircraft, and suddenly subjected to high G forces, the readout 54 would soon stabilize after the G forces are removed. During the G force acceleration the sensor may indicate a "full" readout 54.

The entire system should be in near vertical orientation for accurate readouts. For example the sensor would not work if the aircraft were flying upside down.

The above description is of a preferred embodiment of this invention and is used as an illustration of the basic ideas involved and show their advantages. Of course this invention may be modified or altered and still use and rely upon the methods and scope of the claims.

AIR FILTER 38

Referring to FIG. 2, passenger cabin pressure P1 normally ranges from 14.7 PSIA to 8.0 PSIA. The cabin pressure, P1 is maintained for passenger safety and comfort by supply air from jet engine air compressors. P1 air is drawn into the sensing system thru an air filter 38. The purpose of this air filter 38 is to remove all debris larger than 50 microns in size to avoid plugging the air jet 40. If jet 40 became plugged the sensing system would output erroneous readings. During routine maintenance the sintered metal air filter 38 should be inspected and replaced if dirty.

AIR JET 40

Clean P1 air passes from the air filter 38 into a jet 40 which is mounted just below it. The jet 40 is a small orifice which restricts the air flow to about 0.10 liter per minute and decreases the P1 air pressure to the P2 level. The jet 40 which was used on the test model was a "Lee Jet" (PN# JETA1875300H) 30,000 LOHM value, obtained from The Lee Co, P.O. Box 424, Westbrook, Conn., 06498. Another jet of 10,000 LOHM value was also tested with favorable results although the bubbling was excessive. The jet 40 is press fitted into a stainless steel housing which is threaded into the air reservoir 42. The jet 40 has no adjustments and is very rugged. P1 pressure drops to P2 pressure across this jet as air enters air reservoir 42.

AIR RESERVOIR 42

The purpose of an air reservoir 42 is to allow a quick response and stability to the readouts when the system is energized. When the system is at rest liquid will rise in the bubbler tube 46 to match the height (h) 17 in the waste tank 14. No sewage level measurements are possible until P2 air is emitted as bubbles from the bubble source point 49. When the vacuum pump 28 or P4 vacuum energizes the system, liquid in the bubbler tube 46 is drawn down and into the waste tank 14 until P2 air starts to bubble. The volume of P2 air in the air reservoir is roughly equal to the volume of the bubbler tube 46. This extra volume of air will quickly expand forcing the liquid standing in the bubbler tube to be flushed thru the bubble source point 49. At the moment bubbles begin to emerge from the bubble source point 49, P2 stabilizes. It also acts as a pneumatic cushion to the sensitive differential pressure transducer 60 when turbulence or hard landings cause the waste to momentarily rise in the bubbler tube 46.

SOLENOID VALVE 44

Figure 3B:
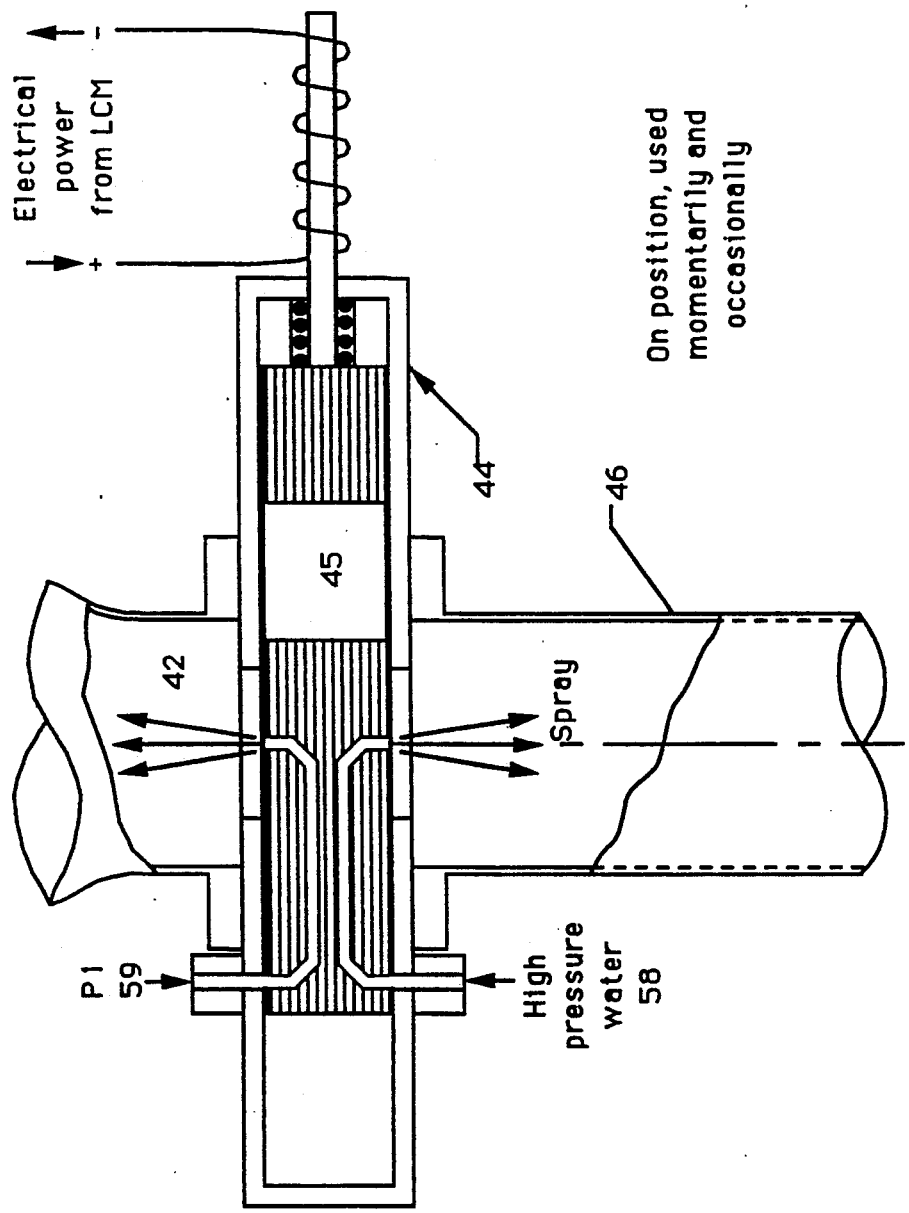

Connecting air reservoir 42 and bubbler tube 46 is a solenoid actuated air/water valve 44. This valve 44 is not required for the current invention to operate, but it might be needed for reliability if the application is for a sewage system, as in the case of this preferred embodiment. Referring to FIGS. 3a and 3b, these drawings are working schematic details of valve 44. It has two positions, one is the normally "off" condition (as shown in FIG. 3a) and the energized "on" condition (as shown in FIG. 3b). When valve 44 is off, P2 air in the air reservoir 42 flows through a large passage 45 directly into the bubbler tube 46. In this case, the high pressure water inlet 58 is closed. Upon energizing the valve to the "on" position, the P2 air flow passage 45 is closed, and two other events occur simultaneously. First, high pressure water 58 from the aircraft water system is sprayed into the top of the bubbler tube 46. This will wash down the insides of the bubbler tube 46 to keep it open and working. The wash down water drains into a lower drain line 34. And second, the air reservoir is vented to ambient pressure P1.

The main purpose for this valve 44 is to prevent blockage of the bubble source point 48 by spraying high pressure water into the bubbler tube 46 and to prevent any reverse flow of sewage thru the bubbler tube 46, into the jet and pressure transducer hose 50. This latter problem is unlikely and is a worst case scenario. The solenoid valve 44 can be energized by the LCM 56 sensing a condition where P2 should become less than P3. This may occur if the vacuum P3 in the waste tank 14 was suddenly lost. Additionally, the valve could be energized manually by a remote switch.

BUBBLER TUBE 46

This tube is manufactured of large diameter stainless steel tubing (approx 1½ inch) to decrease the possibility of clogging with sewage. Because of its large size the pressure drop of P2 air passing from the jet 40 to the bubble source point 48 will be negligible even with varying air flows due to pressure fluctuations. The length of the bubbler tube 46 is designed to locate the solenoid valve 44, air reservoir 42, and other parts 50,40 and 38 high above the level of contamination from sewage 16 rising in it when the system is shut down. The bubbler tube 46 is mounted by semi rigid brackets (not shown) to the waste tank mounting rings 30.

BUBBLE SOURCE POINT 49

A stainless steel tee fitting 48 on the lower drain line 34 connects the bubbler tube 46 to the prior sewage system of the aircraft. This is a key point to the successful operation of this invention. The lower opening of the tee fitting 48 is called the bubble source point 49 and must be kept free and clean so the bubbles can pass into waste tank 14. This level measurement system will work as long as $P1 > P2 > P3$, with the condition that P2 must be greater than P3 by a magnitude to cause bubbles to be emitted from the bubble source point 49.

RUBBER HOSE ASSEMBLIES 50

P2 air pressure is communicated to one port of the differential pressure transducer 60 by an armored flexible rubber hose assembly 50, which originates at the air reservoir 42. P3 air pressure is communicated to the other port of the transducer 60 by another rubber hose assembly 50, similar to the first except it originates from a tee in the upper vent line 22. These hoses 50 can be long or short thus allowing the LCM 56 to be located wherever it is desired. Thus this invention is a "remote" sensor. Any variation in P2 or P3 is quickly (local speed of sound) communicated thru these hoses 50, even if they are long, to the LCM 56 for electronic analysis. The interface medium that actuates this sensor is clean air, free from the contamination found in the waste tank 14.

LOGIC CONTROL MODULE (LCM) 56

Referring to FIG. 4, this is a flow chart of a LCM 56 and a junction box in which it is housed. This module 56 is solid state and shock mounted to the frame of the aircraft. The LCM 56 is mounted close to an access door (not shown) of the aircraft. There is no routine maintenance required of the LCM 56 contents. In the event any component fails there is access to the box 56 through a hinged lid, and the failed item or assembly may be replaced quickly. The components, 62, 66 and 68 are permanently mounted to a printed circuit board (PCB#1) inside the junction box. Each pressure transducer 60 will be attached to another (PCB#2) for quick and economic replacement. This LCM 56 is environmentally sealed from harmful exterior elements such as water, dust, salt and hydraulic fluid as well as tampering. The components of this LCM 56 are not damaged by freezing or hot weather.

TRANSDUCER 60

A transducer is a device which converts input energy of one form into output energy of another form. In the case of this preferred embodiment, only one transducer 60 is required to operate the system. To provide backup should one transducer 60 fail a second and a third transducer 60 may be included in the LCM 56 circuit for voting logic redundancy. Transducers are rugged if properly mounted and protected. The transducer used here a differential pressure type, that is it measures the difference between two pressures. The transducer 60 has two input ports for air hose 50 connections. It also has electric power input 8.00 VDC and gives proportional output signals depending on the height (h) of the sewage. Transducer 60 is of the amplified output type. This usage in the present invention is an optimal application of economical prior art, silicon diaphragm, differential pressure transducer technology.

INPUT POWER 64

The aircraft electric system (not shown in drawings) supplies an input 64 of 24 volts DC to the LCM 56.

VOLTAGE REGULATOR 62

Because the power supply 64 is 24 volts DC and the transducer 60 uses 8 volts DC, there is included a voltage regulator 62 in the LCM circuit to make this change in the power input.

ELECTRIC FILTER 66

P2 and P3 pressures arriving at the transducer 60 may vary depending on the dynamic acceleration or movements of the aircraft. Also contributing to possible gyrations in the readings is agitation of the sewage in the waste tank 14 due to bubbling or flushing. To stabilize the output voltage of the transducer 60, there is a low pass electric filter 66 placed in the circuit. This filter 66 is 3 dB pole point at 0.25 Hz and will feed steady voltages to the logic control board 68 for analysis.

LOGIC CONTROL BOARD 68

A solid state logic control board 68 consists of discrete electronic components and integrated circuits that will analyze the voltage data supplied by the transducer 60. The board 68 converts the input voltages into useable forms as required by the customer. These usable forms (not shown) could include gauges, warning lights, buzzers, relays, and door locks. This board 68 will also energize the solenoid valve 44 when P3 air pressure becomes greater than P2. The logic control board 68 can supply voltage outputs 54 in either digital and/or analog format.

RESULTS OF TESTING

Testing of the present invention was performed on a full scale prototype test model. The testing is documented and reveals that readout 54 data is stable and consistent within one half of one percent accuracy in the following conditions:

a. Either with many large bubbles or with a few small ones b. If a small leak develops in the plumbing of the bubbler tube 46 or air reservoir 42 assembly; or even in the upper vent line 22. Such leaks have no negative effect on the accuracy of this invention.

c. At various values of P1, cabin air pressure. The sensor works whenever P2 is greater than P3 by a magnitude of pgh.

d. At various values of P3. Nearly the entire range of P3 and P4 air outside an aircraft were simulated to match conditions while flying at various altitudes. The invention worked at all simulated altitudes as long as bubbles were emitted from the bubbles source point 49.

e. At various heights (h) of liquid standing in the tank 14. In all these cases accurate, straight-line, linear readouts were obtained.

f. When waste tank 14 was stuffed full with saturated toilet paper or when filled with ice cubes. In all these cases the air bubbles found their way between and around all obstructions to rise to the surface thru the intervening liquid. In all these cases accurate readings were obtained. Frequently the bubbles would break up on hitting an object in the fluid and divide into several smaller bubbles; but read out voltages 54, remained accurate.

g. The system works as long as the liquid is thin enough to allow air bubbles to pass thru and rise to the surface. If the liquid becomes too viscus or thick that air will not bubble thru it, then the sensor will not work.

h. If the system is partly frozen the sensor still works. But in the case the entire sewer system is frozen hard, it will not work. However when it thaws no damage has been done to the sensor and it is ready to work again.

SUMMARY RAMIFICATIONS AND SCOPE

This invention is a reliable mechanism and method of measuring the height of liquid standing in a vacuum tank. It is simple to manufacture and use, withstands high and low temperatures, and environments which are corrosive, contaminating and violent. It is accurate under a wide range of the several variable and gives quick measurement of changing conditions. It is cost effective because it can be supplied for about half the price of prior art. It is light weight and produces no detectable noise or odor. It overcomes the unreliability and high cost associated with all known prior art. This invention, if mounted on a modern aircraft sewage system and holding tank, will work with reliability at all flight altitudes and passenger cabin pressures. Its reliability is derived from using clean air as the interface medium to the contaminating liquid. It can sense liquid levels at a distance using small hoses to communicate the pressures involved. This invention is capable to be retrofitted into existing commercial aircraft, as well as installation on new aircraft models.

We have described a preferred embodiment of this invention as being used on a sewage system of a commercial aircraft, but there are many other uses and ramifications, such as:

(a) Measuring any vacuum tank which holds sewage, or any other liquid thru which gas could be bubbled.

(b) Other applications at ground level are possible if the tank is equipped with a vacuum pump. Illustrative of these applications may be automobiles recreational vehicles, boats, ships, toys, portable chemical toilets, even rural homes with septic tanks could use this invention.

(c) Other sizes shapes and materials provide additional ramifications. For example the bubbler tube may be made out of plastic.

(d) Vacuum tanks subject to a violent or vibrating environment which would foul, or break or short circuit other art would be natural ramifications of this invention.

(e) Safety can be improved by the use of this invention in measuring some potentially explosive liquids where some prior art requires electric power in the proximity of a storage tank with the possibility of sparks and fires. The present invention requires only non-sparking air hoses.

I claim:

1. A liquid sewage level measuring apparatus for measuring the level of liquid sewage inside a vacuum tank comprising gas filter means for drawing a flow of measurement gas, gas jet means coupled to said gas filter means for drawing a reduced flow of said measurement gas;

gas reservoir means for receiving said reduced flow of measurement gas, said gas reservoir means being coupled on one end to said gas jet means;

gas bubbler tube means for passing said reduced flow of measurement gas to the liquid sewage inside said vacuum tank, said gas bubbler tube means being coupled to the other end of said gas reservoir means and to a drain line means of said vacuum tank containing the liquid sewage;

upper vent line means connected to said vacuum tank for venting the region above the liquid sewage inside said vacuum tank to a partial vacuum pressure which is less than the pressure of said reduced flow of measurement gas inside said gas reservoir means, wherein the pressure in said upper vent line means is the same as the partial vacuum pressure of the region above the liquid sewage inside said vacuum tank;

and differential pressure transducer means coupled on one side by first hose means to said upper vent line means and coupled on the other side by second hose means to said gas reservoir means, wherein said differential pressure transducer means continuously senses and outputs signals corresponding to the level of liquid sewage inside the vacuum tank.

2. A method for continuously determining the level of liquid sewage inside a vacuum tank, said method comprising drawing a flow of measurement gas;

reducing the flow of measurement gas using gas jet means;

receiving said reduced flow of measurement gas in a gas reservoir means;

passing said reduced flow of measurement gas from said gas reservoir means through bubbler tube means connected to lower drain line means of said vacuum tank into the liquid sewage in the form of gas bubbles which rise to the surface of said liquid sewage and pass off into the region above the liquid sewage inside said vacuum tank;

venting the region above the liquid sewage inside said vacuum tank to a partial vacuum pressure using upper vent line means connected to said vacuum tank, wherein the pressure of the gas in said upper vent line means is the same as the partial vacuum pressure of the region above the liquid sewage inside said vacuum tank, and the pressure of said reduced flow of measurement gas inside said gas reservoir means is greater than the partial vacuum pressure of the region above the liquid sewage inside the tank;

and measuring the difference in gas pressures using differential pressure transducer means between a) the partial vacuum pressure existing in said upper vent line means, and b) the pressure inside said gas reservoir means when bubbles of said measurement gas are passed to the liquid sewage in said vacuum tank, wherein said differential pressure transducer means provides a continuous electronic output signal which is proportional to the level of liquid sewage inside said vacuum tank.

* * * * *